(12) United States Patent
Ahn

(10) Patent No.: US 10,054,716 B2
(45) Date of Patent: Aug. 21, 2018

(54) STRENGTHENED COVER LENS AND METHOD FOR STRENGTHENING COVER LENS

(71) Applicant: BUWON PRECISION SCIENCES Co., Ltd., Taoyuan County (TW)

(72) Inventor: Kyung-Chul Ahn, Taoyuan County (TW)

(73) Assignee: Buwon Precision Sciences Co., Ltd., Guanyin Township, Taoyuan County (TW)

( * ) Notice: Subject to any disclaimer, the term of this patent is extended or adjusted under 35 U.S.C. 154(b) by 806 days.

(21) Appl. No.: 14/500,167

(22) Filed: Sep. 29, 2014

(65) Prior Publication Data

US 2016/0091636 A1  Mar. 31, 2016

(51) Int. Cl.
*G02B 1/14* (2015.01)

(52) U.S. Cl.
CPC ..................................... *G02B 1/14* (2015.01)

(58) Field of Classification Search
CPC ....................................................... G02B 1/14
USPC ................................................. 359/513, 514
See application file for complete search history.

(56) References Cited

U.S. PATENT DOCUMENTS

| 2,387,789 | A | * | 10/1945 | Williams | G02C 1/02 351/154 |
|---|---|---|---|---|---|
| 5,220,358 | A | * | 6/1993 | Brown | B29D 12/02 351/159.02 |
| 7,031,070 | B2 | * | 4/2006 | Suzuki | G02B 1/18 359/513 |
| 2002/0057494 | A1 | * | 5/2002 | Lang | B60R 1/08 359/507 |
| 2005/0018330 | A1 | * | 1/2005 | Sakoo | G02B 5/0808 359/884 |
| 2009/0180186 | A1 | * | 7/2009 | Ando | B29C 39/025 359/566 |
| 2010/0039706 | A1 | * | 2/2010 | Danner | G02F 1/161 359/513 |
| 2011/0267713 | A1 | * | 11/2011 | Ventelon | F24J 2/1057 359/884 |

* cited by examiner

*Primary Examiner* — Ricky D Shafer
(74) *Attorney, Agent, or Firm* — Muncy, Geissler, Olds & Lowe, P.C.

(57) ABSTRACT

A strengthened cover lens is disclosed to include a substrate, including an upper surface, a lower surface substantially parallel to the upper surface, a side surface located between the upper surface and the lower surface, and the side surface being substantially perpendicular to the upper surface and the lower surface, an upper chamfer surface formed between the upper surface and the side surface and the upper chamfer surface being adjacent the side surface, a concave portion formed between the upper surface and the upper chamfer surface, and a protection layer covering at least the concave portion and the upper chamfer surface, and a method for strengthening a cover lens being durable for abrasive condition by rigid body such as metal in common use is also provided.

8 Claims, 11 Drawing Sheets

STRENGTHENED COVER LENS AND METHOD FOR STRENGTHENING COVER LENS

BACKGROUND OF THE INVENTION

1. Field of the Invention

The disclosure relates to a strengthened cover lens and methods for strengthening a cover lens. More particularly, the disclosure relates to a strengthened cover glass with a polymer coating layer partially covering a side of substrate in a specific way to increase strength of edges of cover lens.

2. Description of the Related Art

Because of touch glasses are vulnerable to be broken from chippings, cracks and flaws at the edge caused by strong contacts with rigid bodies such as hard metals or the similar hard material which leads function loss of the touch glasses.

Various structures have been used to increase the strength of glass surfaces by modifying the shape and size, and generally coated a layer to side surfaces of a glass article to protect the glass from external impact.

In addition, conventionally coated polymer covers sides without an upper part of the edges, and the protection effect increased as the thickness of coated polymer increased. However, the protection ability might be better at 100 μm or more of the thickness of the coated polymer, but process capability index Cpk may not meet 1.33 under the situation.

SUMMARY OF THE INVENTION

In view of the aforementioned existing technical problems, one purpose of the present invention is to provide a strengthened cover lens and a method for strengthening a cover lens.

According to an aspect of the present invention, a strengthened cover lens is provided, comprising a substrate, comprising: an upper surface; a lower surface substantially parallel to the upper surface; a side surface located between the upper surface and the lower surface, and the side surface being substantially perpendicular to the upper surface and the lower surface; an upper chamfer surface formed between the upper surface and the side surface and the upper chamfer surface being adjacent the side surface; a concave portion formed between the upper surface and the upper chamfer surface; and a protection layer may cover at least the concave portion and the upper chamfer surface.

Preferably, the substrate may further comprise a lower chamfer surface between the lower surface and the side surface.

Preferably, the protection layer may further cover the side surface.

Preferably, the protection layer may comprise polymer resin, and a resin hardness of the protection layer is durometer hardness of A80 to A100.

Preferably, an angle between the upper chamfer surface and the side surface may be about 135 degree.

Preferably, a first thickness from an outer periphery of the protection layer straight to the upper chamfer surface may be within a range between about 30 μm to about 40 μm.

Preferably, a second thickness from an outer periphery of the protection layer straight to the side surface may be within a range between about 60 μm to about 80 μm.

Preferably, a distance from an inner edge of the concave portion straight to an imaginary line through an outermost point on the outer periphery may be in a range of about 100 μm to about 150 μm.

Preferably, an edge of the cover lens may have a value of B10 above 550 MPa in 4-point bending test.

According to another aspect of the present invention, a method for strengthening a cover lens is provide, the method comprising: providing a substrate, the substrate comprising an upper surface, a lower surface substantially parallel to the upper surface, and a side surface locating adjacent to the upper surface and the lower surface, and substantially perpendicular to the upper surface and the lower surface; forming an upper, chamfer surface between the upper surface and the side surface; covering acid-resistant layers on the upper surface and the lower surface, wherein the acid-resistant layer on the upper surface have defined a region for a concave portion on the edge of the upper surface which is predetermined to be etched; acid-etching the upper surface of the glass article to form a concave portion between the upper surface and the upper chamfer surface; and coating a protection layer to cover at least the concave portion and the side surface using a coating source in a coating direction.

Preferably, the coating direction is tilted with an tilt angle relative to an imaginary line from the lower surface straight to the upper surface in a cross-section view, a horizontal component of the coating direction is from the outside to the inside of the upper surface, and a vertical component of the coating direction is from the upper surface to the lower surface, and the tilt angle is in a range from about 30 degree to about 60 degree.

Preferably, the using of the coating source may comprise a needle injection, a jet spray, or drum type coating.

Preferably, the forming of the upper chamfer surface may further comprise the forming of a lower chamfer surface between the lower surface and the side surface.

Preferably, the protection layer further covers and the side surface.

Preferably, the protection layer comprising polymer resin, and a resin hardness of the protection layer is durometer hardness of A80 to A100.

Preferably, an angle between the upper chamfer surface and the side surface is about 135 degree.

Preferably, a first thickness from an outer periphery of the protection layer straight to the upper chamfer surface is up to a range between about 30 μm to about 40 μm.

Preferably, a second thickness from an outer periphery of the protection layer straight to the side surface may be within a range between about 60 μm to about 80 μm.

Preferably, a distance from an inner edge of the concave portion straight to an imaginary line through an outermost point on the outer periphery the side surface may be in a range of about 100 μm to about 150 μm.

Preferably, an edge of the cover lens may have a value of B10 above 550 MPa in 4-point bending test.

As the aforementioned description, the present invention provides a strengthened cover lens and a method for strengthening a cover lens solve the problems concerning that conventional side-coated glass such as 6 face strengthening glass for cover lens and 2 face strengthening glass, one glass sensor, glass-glass structure, was apt to be broken due to stress caused by cracks and defects created during chipping process of glass substrates. The method for strengthening a cover glass also provide a cover lens with a specific profile for side surface to ensure the shape of the protection layer is firmly served as a buffer on the side of the cover lens.

DETAILED DESCRIPTION OF THE PREFERRED EMBODIMENTS

Figure 1:
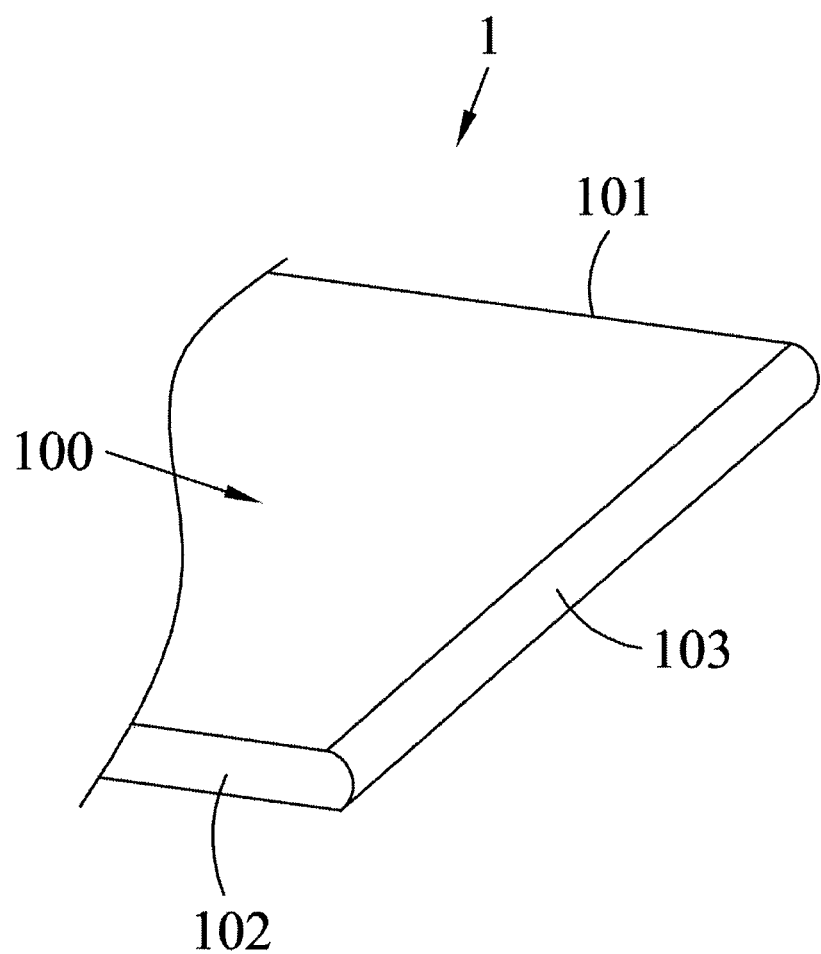
FIG. 1 is a perspective view schematically illustrating a strengthened cover lens according to exemplary embodiments.

Hereinafter, embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be constructed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

A strengthened cover lens and a method for strengthening a cover lens are provided. The strengthened cover lens includes a substrate with an upper surface, a lower surface, and a side surface, wherein an upper chamfer surface forms between the upper surface and the side surface. A concave portion is formed between the chamfer surface and the side surface of the substrate, and a protection layer covers at least the concave portion and the side surface to strengthen the edge of the cover lens. The method comprises providing a cover lens including a substrate, the substrate having a side surface, modifying the side surface by acid-etching portions without acid-resistant, coating a protection layer to cover at least a portion of the surface using a coating source with an angle relative to a vertical imaginary line, thereby strengthening the edge of the cover lens. Although only one surface of the may be described herein, it is understood that, unless otherwise specified, the method described herein is applicable to one or more surfaces of a cover lens.

Figure 2:
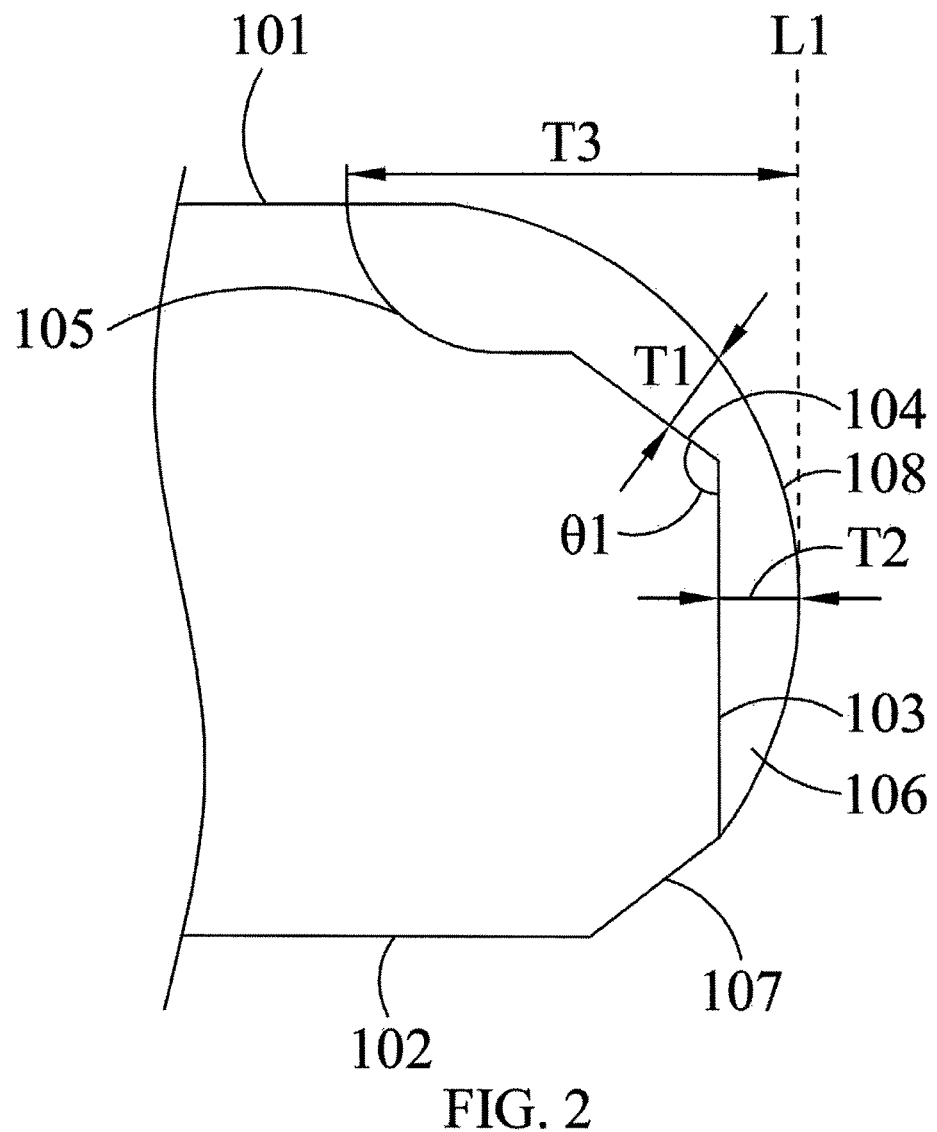
FIG. 2 is a cross-sectional view from a side of the strengthened cover lens in FIG. 1.

FIG. 1 is a perspective view schematically illustrating a strengthened cover lens according to exemplary embodiments, and FIG. 2 is a cross-sectional view from a side of the strengthened cover lens in FIG. 1.

One embodiment of the strengthened cover lens is schematically shown in FIG. 1 and FIG. 2. As shown in FIG. 1, a strengthened cover lens 1 including a substrate 100. The substrate 100 comprises an upper surface 101, a lower surface 102 which is substantially parallel to the upper surface 101, and a side surface 103 located between the upper surface 101 and the lower surface 102. Here, the substrate 100 may include various type of cover glass or touch sensor fabricated by transparent materials, such as, but not limit to, glass or plastic substrate. The substrate 100 can further include electrically active layers, such as those comprising dielectric or conductive materials used in the manufacture of touch screens, panels, or displays. The substrate 100 can also be used as a touch screen, a touch panel, a display panel, a window, a display screen, a cover plate, a casing, or an enclosure for electronic communication and entertainment devices, such as games, cell phones, music, and DVD players and the like, as well as for information terminal devices, such as laptop computers and the like.

The substrate 100 further comprises an upper chamfer surface 104 formed between the upper surface 101 and the side surface 103 with an angle θ1 formed between the upper chamfer surface 104 and the side surface 103. And a concave portion 105 is formed between the upper surface 101 and the upper chamfer surface 104. In a preferable embodiment in the present invention, the angle θ1 may be about 135 degrees, but not limited to, the angle θ1 may be various appropriate angles. The concave portion 105 is formed between the upper surface 101 and the upper chamfer surface 104 to provide a space for a protective coating to protect an upper edge of the substrate. In addition, the substrate 100 may further comprise a lower chamfer surface 107 between the lower surface 102 and the side surface 103.

A protection layer 106 is arranged to cover the concave portion 105, the upper chamfer surface 104, and the side surface 103. The protection layer 106 has an outer periphery 108. The distance between the outer periphery 108 and the upper chamfer surface 104 is denoted as a first thickness T1. The distance between the outer periphery 108 and the side surface 103 is denoted as a second thickness T2, the distance from an edge point straight to an vertical imaginary line L1 through the outermost point on the outer periphery 108 is denoted as a third thickness T3 in FIG. 2. The Amount of the first thickness T1 and second thickness T2 depends on viscosity and hardness of material used for the protection layer 106. Temperature, humidity, and surface tension during processes for forming the protection layer 106, in other words, the above properties control the shape of the protection layer 106. Although effects in strengthening the cover lens increase as the first thickness T1 and the second thickness T2, however, a process capability index Cpk of the cover lens 1 will be limited by the thickness of the protection layer 106. For example, when an average thickness of a coating layer on a round shape side surface on edges of a glass article generally used in conventional glass strengthening structure is about 100 μm, the cover lens can't meet the process capability index Cpk 1.33. In one preferable embodiment of the present invention, the first thickness T1 may be within a range of about 30 μm to about 40 μm. In another preferable embodiment of the present invention, the second thickness T2 may be within a range of about 60 μm to about 80 μm. In a still another preferable embodiment, the third thickness T3 may be within a range of about 100 μm to about 150 μm.

Materials for the protection layer 106 according to the present invention may be selected from various themopolymerizable resins, such as acrylic thermosetting resins, thermo-curable PU resins, or thermo-curable epoxy resins. The thermo-polymerizable resins are not described in detail here as they are well-known in the art. Other materials may also be used to produce the protection layer 106 according to the present invention, as long as it has appropriate viscosity and hardness and can be affixed to the substrate 100, and may be utilized in the coating process. The protection layer 106 not only serves as a buffer for edges of the cover lens 1 to avoid edge effect, but also reduces or even eliminate the focus of micro-cracks as a starting point where the stress affects. The protection layer 106 may be effective to absorb vibration generated by external force and to reduce the impact. In one preferable embodiment of the present invention, a resin hardness of the protection layer 106 is durometer hardness of A80 to A100.

Figure 3:
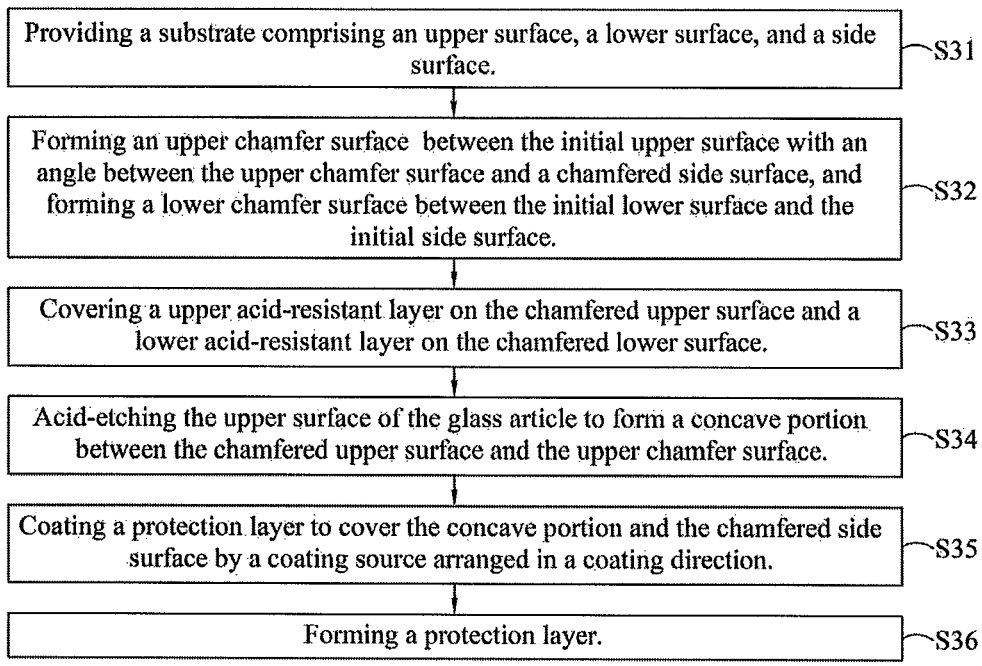
FIG. 3 is a flow chart subsequently illustrating an edge shaping method for polymer coating to strengthen a cover lens.

FIG. 3 is a flow chart subsequently illustrating an edge shaping method for polymer coating to strengthen a cover lens, and FIG. 4A to FIG. 4G are cross-sectional views schematically illustrating each step of the method for strengthening a cover lens, according to the present invention.

Referring to FIG. 3 and FIG. 4A to FIG. 4G, subsequently shows steps of a method for strengthening a cover lens a method for strengthening a cover lens according to the present invention. The method includes the step of: providing a substrate 400, the substrate 400 comprising an upper surface 401, a lower surface 402 substantially parallel to the upper surface 401, and a side surface 403 locating between the upper surface 401 and the lower surface 402, wherein the side surface 403 is substantially perpendicular to the upper surface 401 and the lower surface 402 (Step S31); forming an upper chamfer surface 404 between the initial upper surface 401 with an angle θ2 between the upper chamfer surface 404 and a chamfered side surface 403', and forming a lower chamfer surface 407 between the initial lower surface 402 and the initial side surface 403 (Step S32), wherein a chamfered upper surface 401' and a chamfered lower surface 402' are formed after the forming of the upper chamfer surface 404 and the lower chamfer surface 407 is completed. Here, the forming of the upper chamfer surface 404 and the lower chamfer surface 407 may use those means known in the art, such as scribing and breaking, mechanical cutting, laser cutting, or the like. In a preferable embodiment in the present invention, the angle θ2 may be about 135 degree to provide a suitable tilt angle for subsequent process, but not limited to, the angle v2 may be various appropriate angles.

Next, covering a upper acid-resistant layer 410 on the chamfered upper surface 401' and a lower acid-resistant layer 420 on the chamfered lower surface 402' (step S33), wherein the upper acid-resistant layer 420 on the chamfered upper surface 401' have defined a region R1 for a concave portion on the edge of the upper surface which is predetermined to be etched. The acid resistant layers may include acid-resistant material generally for protecting glass from being etched by etchant, and may be changed in accordance with material of the substrate and corresponding etchant. The acid-resistant material may be formed on the processing surface by spin coating, chemical vapor deposition (CVD), atomic layer deposition (ALD), molecular layer deposition (MLD), and the like. The acid-resistant layers on the chamfered upper surface 401' and the chamfered lower surface 402' each with different lengths to define the start-point of etching.

Acid-etching the chamfered upper surface 401' of the substrate 400 is then be performed to form a concave portion 405 between the chamfered upper surface 401' and the upper chamfer surface 404 (step S34), an etched upper surface 401" and an etched upper chamfer surface 404' are formed after the forming of the concave portion 405 is completed. The lowest point of concave portion 405 may preferable be higher than the etched upper chamfer surface 404' to provide a smooth portion for subsequent process. The acid-etching may be performed using any suitable acid such as an etchant comprised hydrofluoric acid, a mineral acid, an organic acid, combination thereof, and the like, and the etchant should be suitable for the material of the substrate 400.

Figure 4A:
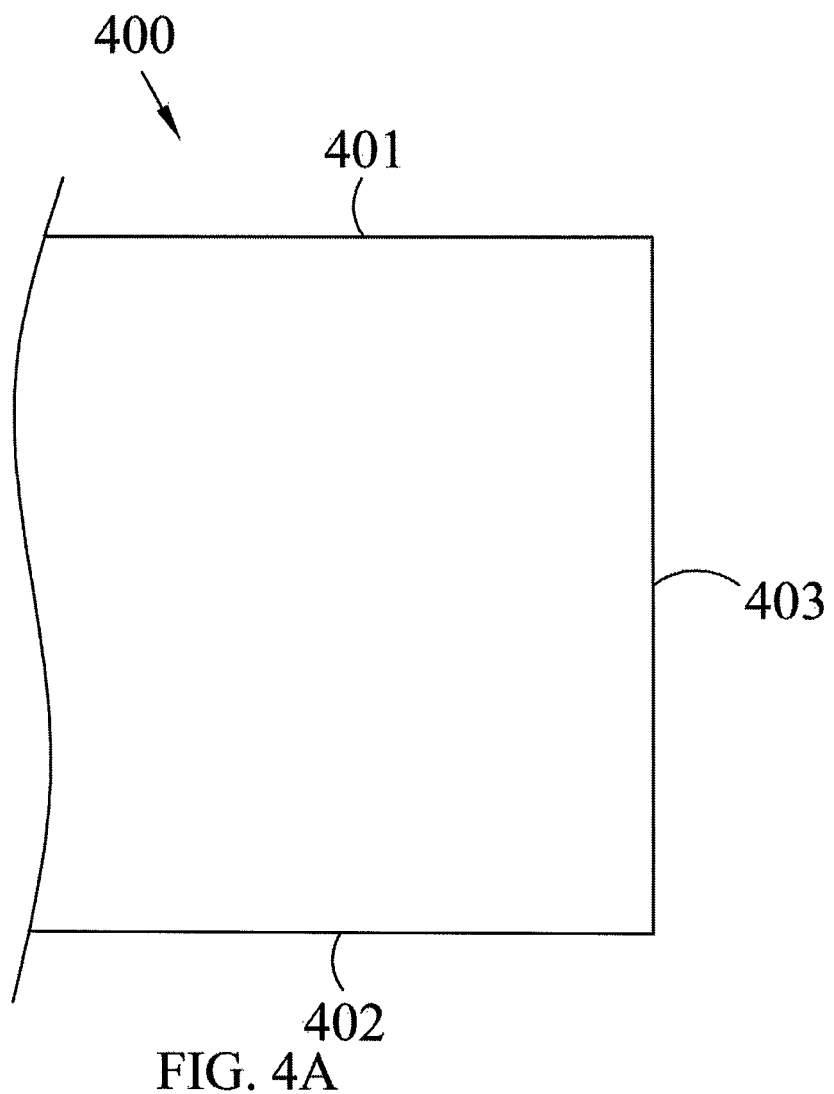
FIG. 4A to FIG. 4G are cross-sectional views schematically illustrating each step of the method for strengthening a cover lens, according to the present invention.
Figure 4B:
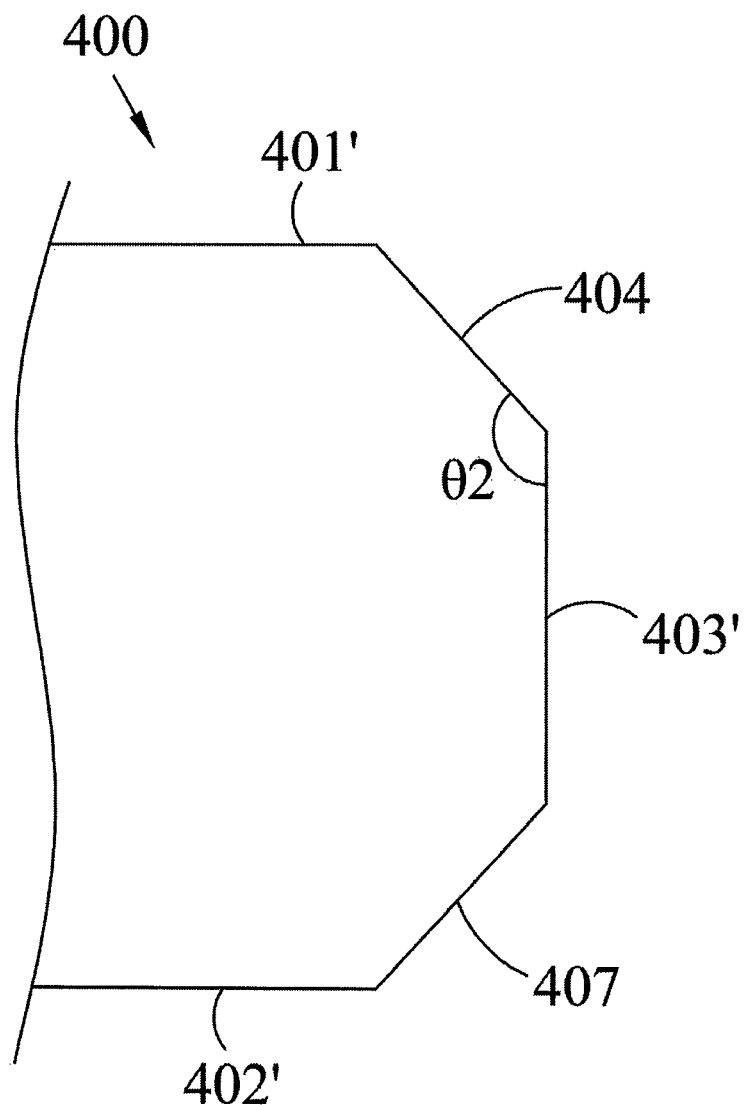
Figure 4C:
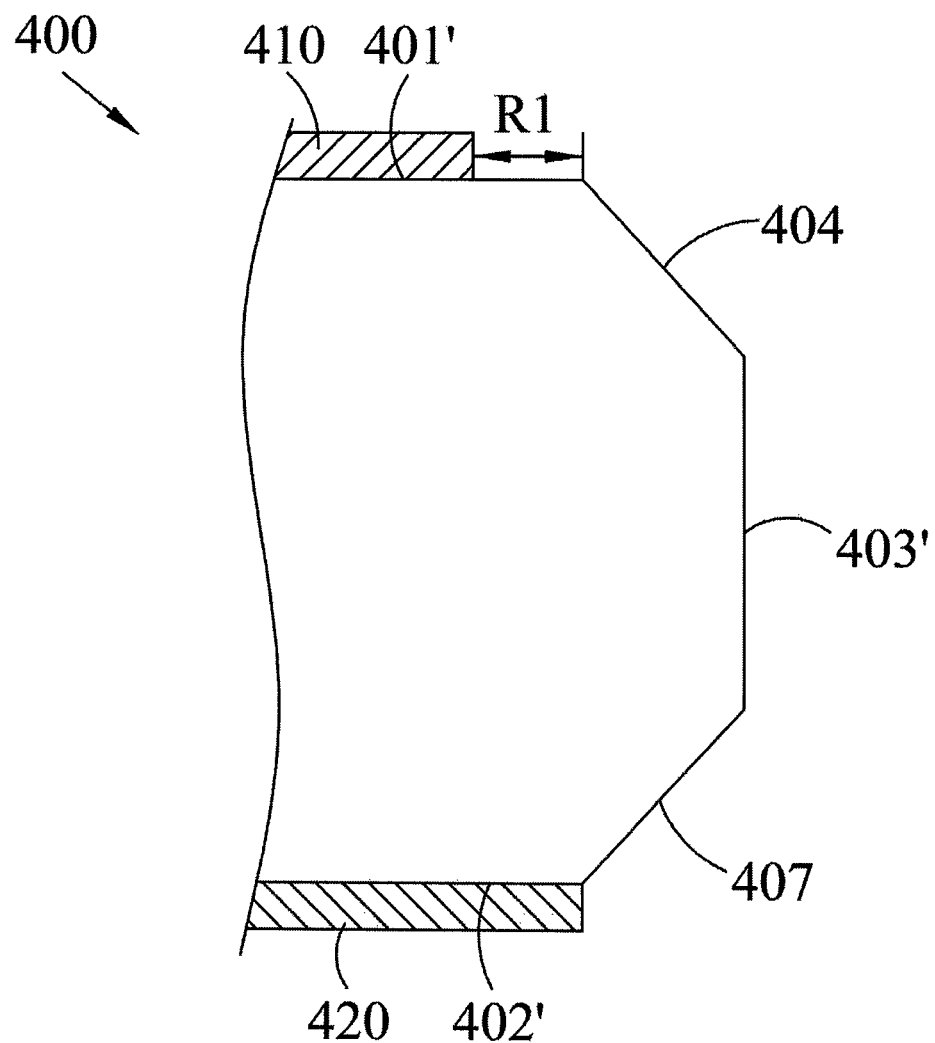
Figure 4D:
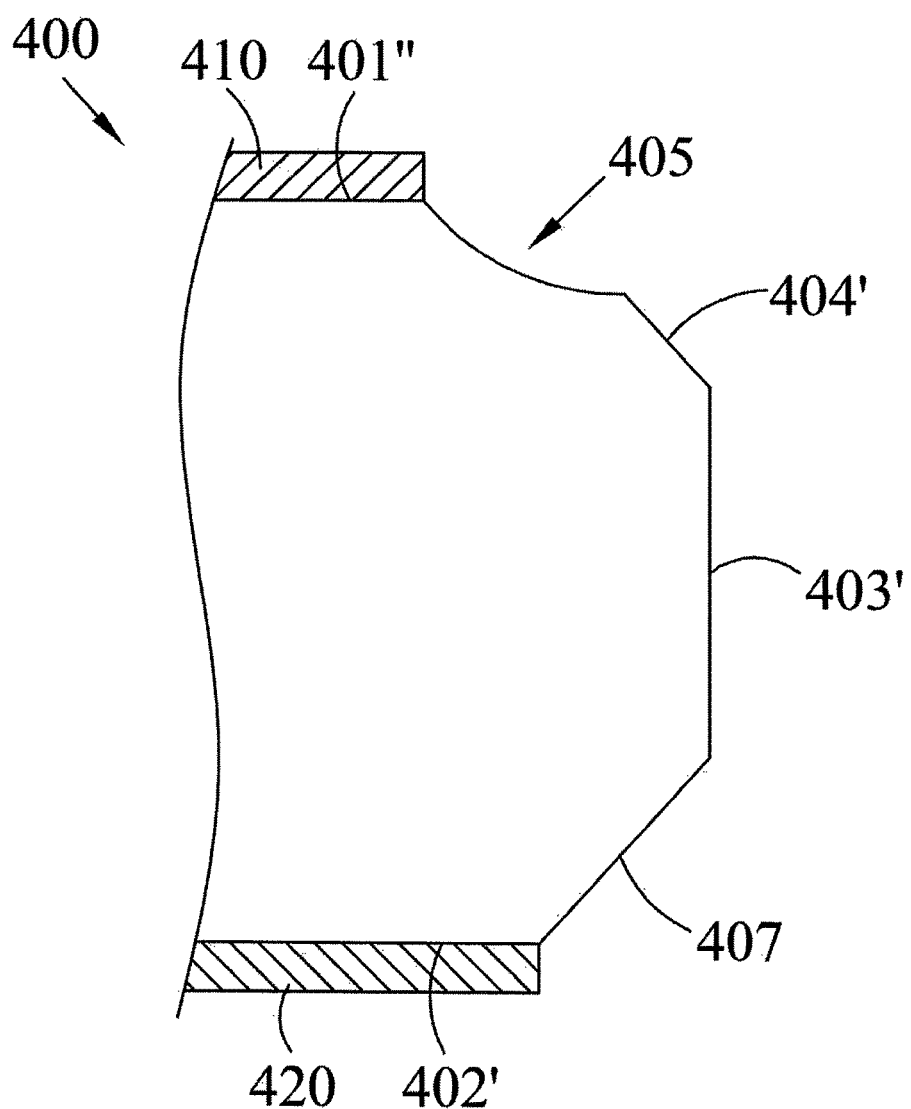
Figure 4E:
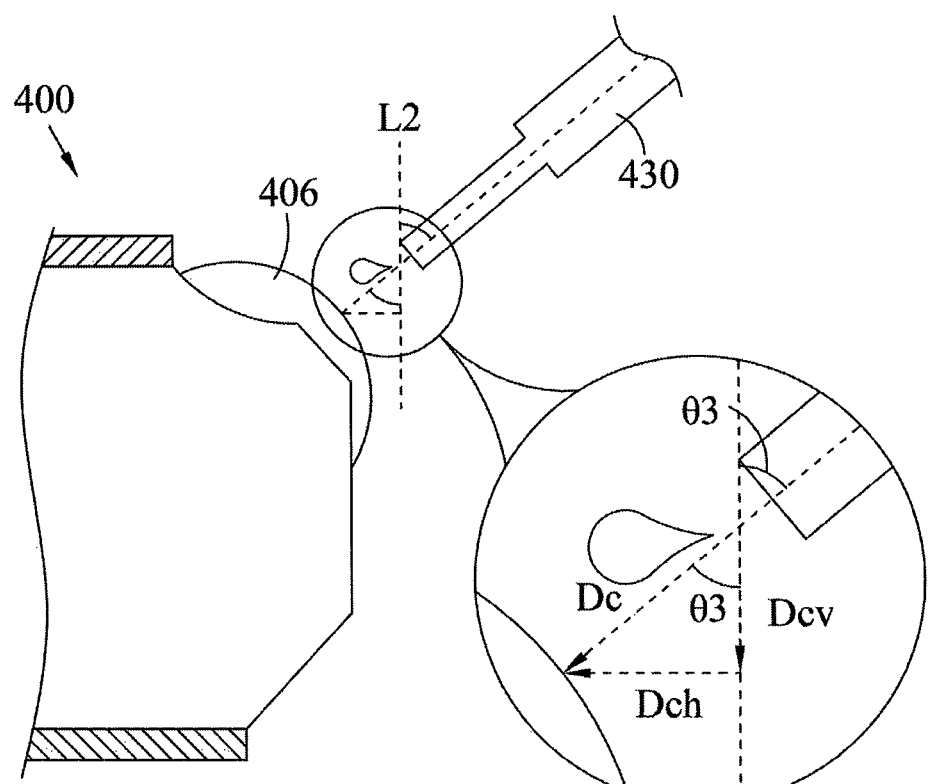
Figure 4F:
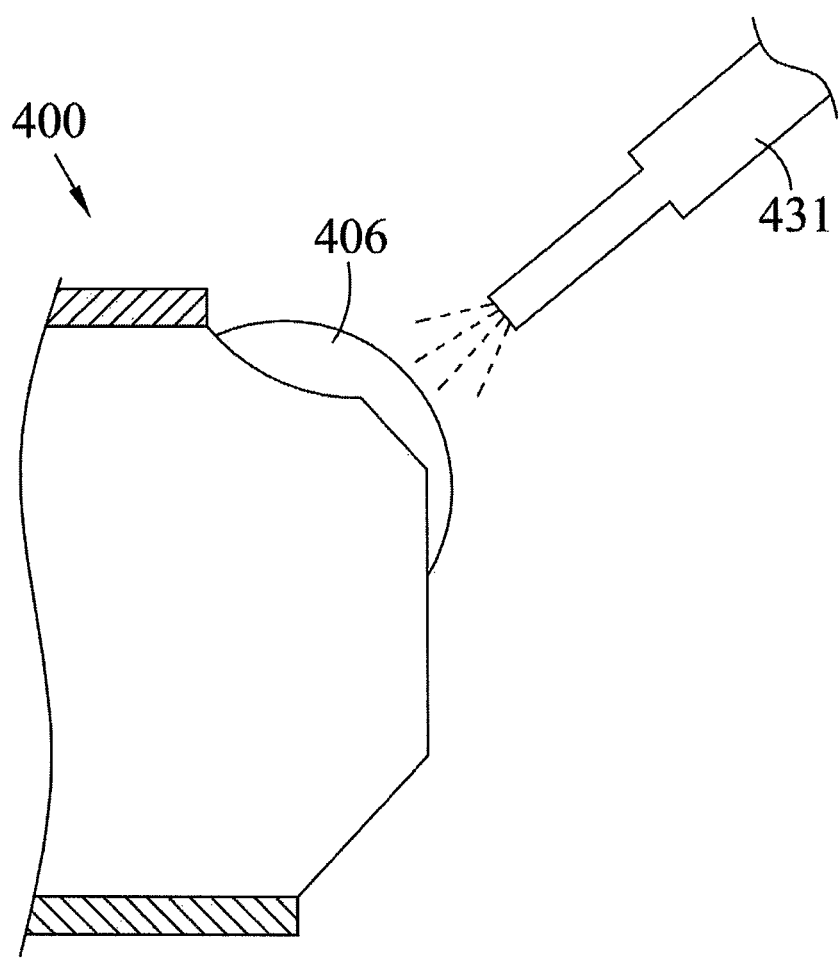

Next, coating a protection layer to cover the concave portion 405 and the chamfered side surface 403' by a coating source 430 arranged in a coating direction Dc (step S35), the coating direction Dc is tilted with an tilt angle θ3 relative to an imaginary line L2 from the chamfered lower surface 402' straight to the etched upper surface 401" in a cross-sectional view. The horizontal component Dch of the coating direction is from the outside to the inside of the substrate 400 along a horizontal direction D1, and the vertical component Dcv of the coating direction is from the etched upper surface 401" straight to the chamfered lower surface 402'. In a preferable embodiment of the present invention, the tilt angle θ3 is in a range from about 30 degree to about 60 degree to form an initial protection layer 406, and an inner side of the concave portion 405 may be starting point for coating of the initial protection layer 406. Here, the coating source 430 is a needle injection. In another exemplary embodiment of the present invention, the coating source 431 is a jet spray as shown in FIG. 4F, moreover, the coating source may also be a drum type coating (not shown). Material for the initial protection layer 406 according to the present invention may be selected from various themo-polymerizable resins, such as acrylic thermosetting resins, thermo-curable PU resins, or thermo-curable epoxy resins. Other materials may also be used to produce the initial protection layer 406 according to the present invention, as long as it has appropriate viscosity and hardness and can be affixed to the substrate 400, and may be utilized in the coating process. The material of the present invention has a photocurable property, and a cured product thereof shows a high adhesive strength without being influenced by e.g. cutting water. Here, the process temperature may be controlled to insure sufficient viscosity for the material before curing of the initial protection layer 406. Here, resin hardness of the material for the initial protection layer 406 may be durometer hardness of A80 to A100.

Figure 4G:
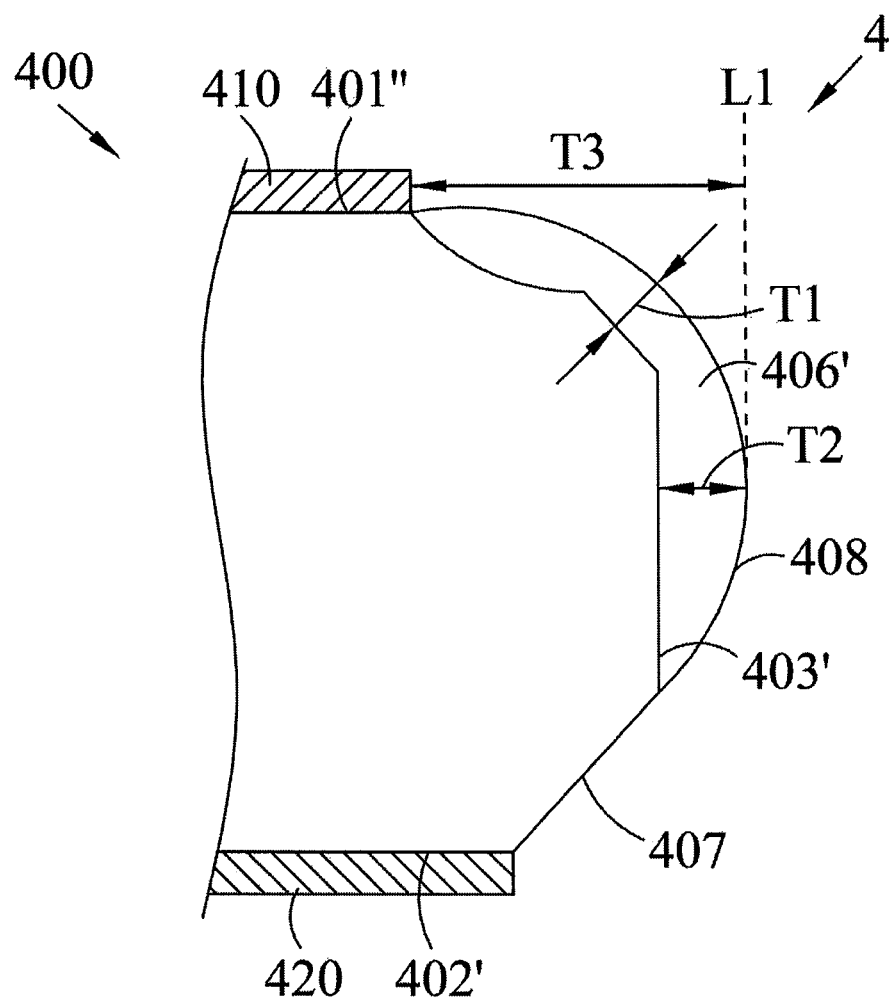

The FIG. 4G showed a completed cover lens strengthened by the method of the present invention. A cured protection layer 406' eventually formed to cover the concave portion 405, the etched upper chamfer surface 404', and the chamfered side surface 403' without covering the lower chamfer surface 407 (step S36). Shape of the cured protection layer 406' shaped in accordance with viscosity and hardness of material used for the protection layer 106, temperature, humidity, and surface tension during processes for forming the cured protection layer 406'. An edge between the lower chamfer surface 407 and the chamfered side surface 403' may also provide surface tension during the forming of the cured protection layer 406'. The curing of the initial protection layer 406 may include hardening by heat or ultraviolet light. Definition of first thickness T1, second thickness T2, and the third thickness T3 are similar to the definition in FIG. 2, where the upper chamfer surface 104 corresponds to the etched upper chamfer surface 404', the side surface 103 corresponds to the chamfered side surface 403', and the outer periphery 108 of the protection layer 106 corresponds to an outer periphery 408 of the cured protection layer, as shown in FIG. 2 and FIG. 4G. The first thickness T1 may be within a range of about 30 μm to about 40 μm. In another preferable embodiment of the present invention, the second thickness T2 may be within a range of about 60 μm to about 80 μm. In a still another preferable embodiment, the third thickness T3 may be within a range of about 100 μm to about 150 μm.

Figure 5:
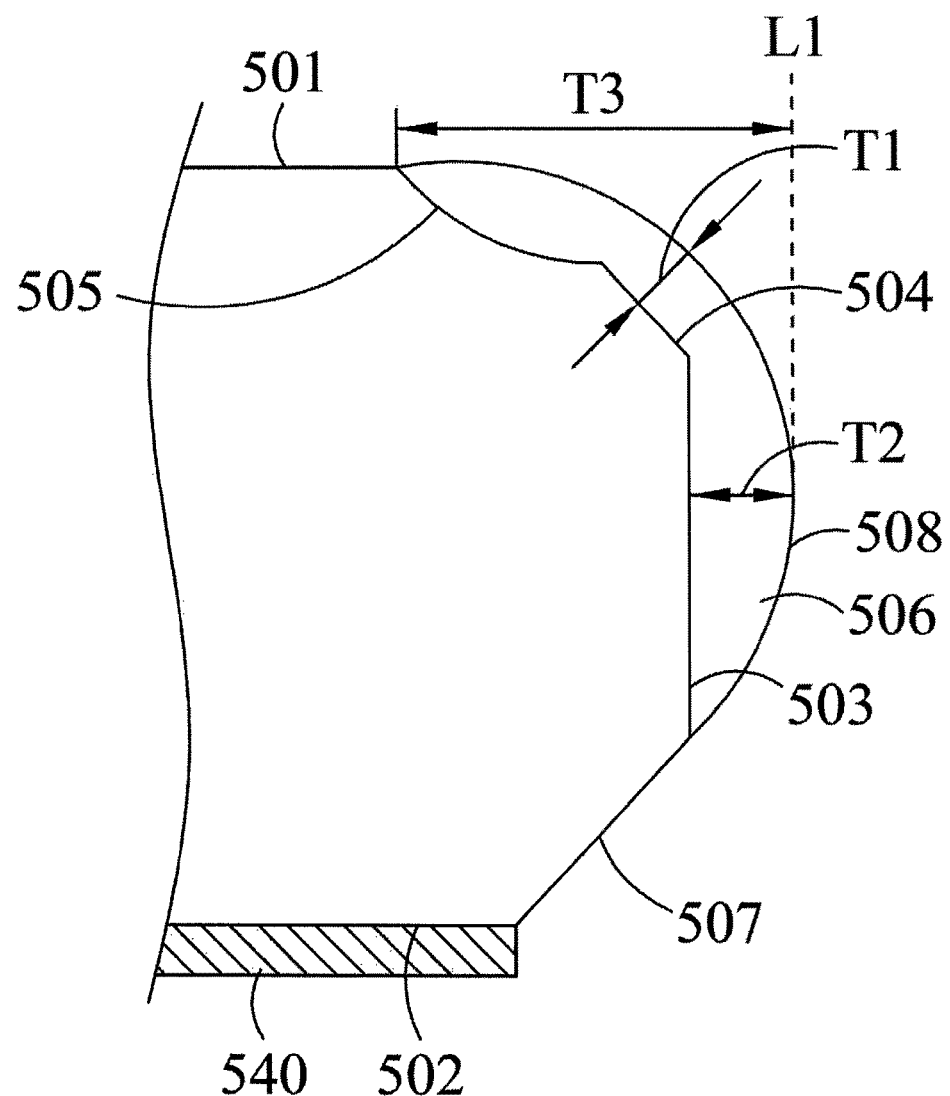
FIG. 5 is a cross-sectional view from a side of a strengthened cover lens according to another exemplary embodiment of the present invention.

FIG. 5 is a cross-sectional view from a side of a strengthened cover lens according to another exemplary embodiment of the present invention. A cover lens 5 includes an upper surface 501, a lower surface 502, a side surface 503, an upper chamfer surface 504, a concave portion 505, a protection layer 506 with an outer periphery 508, and a lower chamfer surface 507 are similar to the cover lens 1 in FIG. 1, therefore the detail description is omitted for conciseness. An electronic member 540 is disposed on the lower surface, the electronic member 540 may be any electronic members in the handheld electronic device and may include, but are not limited to communication devices; entertainment devices such as music players, game consoles, etc.; video camera means; and/or information terminal device (IT), such as laptop computers, etc., the cover lens 5 may serve as a cover glass, display screens, touch screens or glass with black matrix and back light modules utilized in liquid crystal display (LCD), light-emitting diode (LED), and organic light-emitting diode (OLED) display under thereof, and may be suitable for various type touch glass such as one glass sensor (OGS), cover glass-film, or glass-glass structures.

In some embodiments, the strengthened cover lens according to the present invention has a value of B10 above 550 MPa, based on four point horizontal bend testing (4 pb). To create real-environment to test strength of the edge of the strengthened cover lens, the strengthened cover lens is fixed slantly at 45 degree, be pressed with 250 gr, and be scratched 10 mm by sand paper with roughness of #320, while using a computer numerical control (CNC) machine coupled to a jig. The processed samples of cover lens is placed between four point bending testing device, and be pressed with speed 5-10 mm/min. Here, the testing data comprising applied pressure and corresponding testing numbers is statistically analyzed by Weibull Distribution to get a value of B10, where the value of B10 means a testing pressure with 10% samples will break among a batch of testing samples. The obtained value of B10 of the strengthened cover lens samples of the present invention are above 550 MPa. Moreover, the strengthened cover lens also passes drop test and pendulum impact test. Samples of the strengthened cover lens of the present invention are safe from vertical free drop of 6 gr steel ball, and after pendulum impact of 168 gr steel cylinder stroke at 90 degree, only the protection layer made of polymer was torn.

In accordance with aforementioned description, the present invention provides a strengthened cover lens and a method for strengthening a cover lens solve the problems concerning that conventional side-coated glass is broken under 300 MPa due to stress caused by cracks and defects created during processing of glass substrates. The method for strengthening a cover glass also provide a cover lens with a specific profile for side surface to ensure the shape of the protection layer is firmly served as a buffer on the side of the cover lens.

Obviously, the present invention has made a breakthrough and definitely accomplished the desired improved effect which is not easily to think of by a skilled person in the art; moreover, the present invention has not been published prior to the file of the patent application, and the inventiveness, practicability thereof both conform with the patentability, and the patent application is hereby provided in accordance with the regulations.

While the means of specific embodiments in present invention has been described by reference drawings, numerous modifications and variations could be made thereto by those skilled in the art without departing from the scope and spirit of the invention set forth in the claims. The modifications and variations should in a range limited by the specification of the present invention.

What is claimed is:

1. A strengthened cover lens, comprising:
a substrate, comprising:
an upper surface;
a lower surface substantially parallel to the upper surface;

a side surface located between the upper surface and the lower surface, and the side surface being substantially perpendicular to the upper surface and the lower surface;

an upper chamfer surface formed between the upper surface and the side surface and the upper chamfer surface being adjacent the side surface;

a concave portion formed between the upper surface and the upper chamfer surface; and a protection layer covering at least the concave portion and the upper chamfer surface;

wherein the protection layer further covers the side surface.

2. The strengthened cover lens of claim 1, wherein the substrate further comprising a lower chamfer surface between the lower surface and the side surface.

3. The strengthened cover lens of claim 1, wherein the protection layer comprising polymer resin, and a resin hardness of the protection layer is durometer hardness of A80 to A100.

4. The strengthened cover lens of claim 1, wherein an angle between the upper chamfer surface and the side surface is about 135 degrees.

5. The strengthened cover lens of claim 1, wherein a first thickness from an outer periphery of the protection layer straight to the upper chamfer surface is within a range between about 30 μm to about 40 μm.

6. The strengthened cover lens of claim 1, wherein a second thickness from an outer periphery of the protection layer straight to the side surface is up to a range between about 60 μm to about 80 μm.

7. The strengthened cover lens of claim 1, wherein a third thickness from an inner edge of the concave portion straight to an imaginary line through an outermost point on an outer periphery of the side surface is in a range of about 100 μm to about 150 μm.

8. The strengthened cover lens of claim 1, wherein an edge of the cover lens has a value of B10 above 550 MPa in 4-point bending test.

* * * * *